United States Patent [19]

Naiman et al.

[11] Patent Number: 4,757,862

[45] Date of Patent: Jul. 19, 1988

[54] SHALE STABILIZER AND METHOD OF USE THEREOF

[75] Inventors: Michael I. Naiman, St. Louis; John A. Schield, Chesterfield, both of Mo.

[73] Assignee: Petrolite Corporation, St. Louis, Mo.

[21] Appl. No.: 899,187

[22] Filed: Aug. 21, 1986

[51] Int. Cl.$^4$ .......................................... E21B 33/138
[52] U.S. Cl. .................................... 166/295; 175/72; 523/130; 523/132
[58] Field of Search ............... 523/130, 132; 166/295; 175/72

[56] References Cited

U.S. PATENT DOCUMENTS

| | | | |
|---|---|---|---|
| 2,801,984 | 8/1957 | Morgan | 166/295 |
| 3,011,547 | 12/1961 | Holbert | 175/72 |
| 4,142,595 | 3/1979 | Anderson | 175/72 |
| 4,268,400 | 5/1981 | Lucas | 526/307.6 |
| 4,288,582 | 9/1981 | Lucas | 524/547 |
| 4,323,463 | 4/1982 | Morduchowitz | 526/307.5 |

FOREIGN PATENT DOCUMENTS

| | | | |
|---|---|---|---|
| 7803076 | 9/1978 | Netherlands | 175/72 |
| 804684 | 2/1981 | U.S.S.R. | 175/72 |

Primary Examiner—C. Warren Ivy
Attorney, Agent, or Firm—Charles E. Smith; Robert E. Wexler

[57] ABSTRACT

Water-soluble copolymers which are essentially free of cross-linking are useful as shale stabilizers. These copolymers are random copolymers of a vinyl carboxamide monomer and a hydroxy-containing vinyl carboxylic ester. These shale stabilizers are added to a drilling fluid which is then circulated through a well bore whereby the shale stabilizers come in contact with the shale formation and inhibit hydration of shale to prevent sloughing thereof.

2 Claims, No Drawings

SHALE STABILIZER AND METHOD OF USE THEREOF

BACKGROUND OF THE INVENTION

1. Field of the Invention

This invention relates to drilling fluids utilized in oil well drilling operations. More particularly, the present invention relates to shale stabilizers, to drilling fluids comprising such stabilizers and to a method of use thereof to stabilize shale formations encountered during an oil well drilling operation.

More particularly, the present invention relates to water-soluble copolymers of an amide of a vinyl carboxylic acid and a hydroxy-containing ester of a vinyl carboxylic acid. These copolymers are effective as shale hydration inhibitors and can be added to a drilling fluid and circulated through a shale formation whereby shale sloughing during an oil well drilling operation is significantly reduced.

To remove cuttings produced during an oil well drilling operation, a drilling fluid is circulated down the drill pipe and up the annulus between the drill pipe and the formation whereby the cuttings are carried to the surface. The cuttings are then shaken out of the drilling fluid and the fluid is recirculated. In addition to removing cuttings, the drilling fluid also coats and lubricates the drill bit and stabilizes the formation.

In some areas, formations known as heaving or sloughing shales are penetrated during a well-drilling operation. These shales have a tendency to swell or crack upon contact with the drilling fluid whereupon the bore hole walls are rendered unstable and the heaving shale material, which makes up such walls, sloughs into the bore hole. Sloughing of shale material into the bore hole can cause the drill stem to become stuck and can enlarge the bore hole with the result that large subterranean cavities are formed. Furthermore, where sloughing occurs while the drilling bit is being changed at the surface, the bore hole fills up and must be cleared before drilling can proceed. In addition, the heaving shale material taken up into the drilling fluid adversely affects the viscosity characteristics of the drilling fluid to the point where the fluid must be chemically treated to reduce the viscosity thereof or it must be diluted followed by the addition of weighting material to maintain a given mud weight.

The present invention provides shale stabilizers which can be added to a drilling fluid to eliminate or significantly reduce shale sloughing. The present shale stabilizers are comprised of water-soluble copolymers of an amide of a vinyl carboxylic acid (vinyl carboxamide) and an ester of a vinyl carboxylic acid wherein the ester includes a hydroxy-containing organic radical (hydroxy-containing vinyl carboxylic ester). Preferred vinyl carboxamides include acrylamide and methacrylamide. Preferred hydroxy-containing vinyl carboxylic esters include hydroxyalkyl and polyhydroxyalkyl esters, and hydroxypoly(alkoxy) esters of acrylic or methacrylic acid.

2. Prior Art

A wide variety of additives have been utilized in drilling fluids to stabilize shale formations encountered during oil well drilling operations. For example, Weiss et al. U.S. Pat. No. 2,802,783 disclose saturating an aqueous drilling fluid with calcium hydroxide; Scott et al. U.S. Pat. No. 3,017,351 disclose incorporating into the drilling fluid an acetate salt of an amide of a fatty acid and a polyamine along with ammonium sulfate, oil and an acrylamide polymer hydrolyte; Blattel et al. U.S. Pat. No. 4,341,645 disclose salts of copolymers of acrylic acid and hydroxypropyl acrylate; and Dupre et al. U.S. Pat. No. 4,299,710 disclose the combination of an acid-containing polymer and a polysaccharide wherein the acid-containing polymer can be a copolymer of any one of a long list of saturated carboxylic acids, including acrylic acid or a half-amide of a dicarboxylic acid, with any one of a long list of vinyl monomers, including 2-hydroxyethyl and hydroxypropyl acrylates. These additives all require formation of salts in order to be utilized in aqueous-based drilling fluids.

Copolymers of vinyl carboxamides, such as acrylamide and methacrylamide, and hydroxyalkyl esters of vinyl carboxylic acids, such as 2-hydroxyethyl acrylamide, and oxyalkylated derivatives thereof, have been utilized in a wide variety of forms for various applications. For example, Dusek U.S. Pat. No. 3,984,841 discloses hydrophilic gels which are useful in a variety of medical applications and which are derived from free radical initiated copolymers of 2-hydroxyethyl methacrylate and an amide of acrylic or methacrylic acid wherein the weight percent of acrylamide based on the total weight of the monomers is from about 20 to 80 percent and that of methacrylamide is from 20 to 90 percent. Merriam U.S. Pat. No. 2,870,129 discloses copolymers of acrylic acid or acrylamide and alkoxyalkyl acrylates which form water vapor permeable resins. Such gels and resins are not suitable for use as additives for drilling fluids.

Similar copolymers have also been prepared and utilized in a variety of applications. See, for example, Shulz et al. U.S. Pat. Nos. 4,463,151; 4,463,152 and 4,546,784 and Maurer et al U.S. Pat. No. 4,579,926 which disclose free radical initiated copolymers of acrylamide and alkyl poly(etheroxy) acrylates effective as brine viscosifiers. These copolymers are not effective for inhibiting shale hydration; Lucas et al. U.S. Pat. Nos. 4,268,400 and 4,288,582 which disclose terpolymers of a monovalent alkali metal salt of acrylic acid, a hydroxyalkyl acrylate and acrylamide for use as filtration control additives in drilling fluids; and Morduchowitz U.S. Pat. No. 4,323,463 which discloses a terpolymer of acrylamide, acrylonitrile and poly(oxyethyl) acrylate which is useful as a water thickener in a secondary oil recovery process. These terpolymers require formation of a monovalent alkali metal salt of the acrylic acid to be useful in aqueous-based drilling fluids.

BRIEF DESCRIPTION OF THE INVENTION

The present invention is concerned with shale stabilizers comprising water-soluble copolymers which are essentially free of cross-linking. These copolymers are random copolymers of a vinyl carboxamide monomer, such as an amide of either acrylic or methacrylic acid, and a hydroxy-containing vinyl carboxylic ester, such as 2-hydroxyethyl methacrylamide and polyethylene glycol monomethacrylates. These shale stabilizers are adapted to be added to a drilling fluid which is then circulated through a well bore whereby the shale stabilizers come in contact with the shale formation and inhibit hydration of shale to prevent sloughing thereof.

DETAILED DESCRIPTION OF THE INVENTION

The shale stabilizers of the present invention are water-soluble inverse emulsion copolymers of a vinyl carboxamide and a hydroxy-containing vinyl carboxylic ester. These copolymers can be described generally as random copolymers which are essentially free of cross-linking. It is contemplated that these copolymers have molecular weights from about 800,000 to about 5 million.

The vinyl carboxamides and vinyl carboxylic esters which may be suitable for use in the practice of the present invention include amides and esters of $\alpha,\beta$-unsaturated carboxylic acids. Examples of $\alpha,\beta$-unsaturated carboxylic acids include acrylic acid, crotonic acid, isocrotonic acid, methacrylic acid, cinnamic acid and the like.

The vinyl carboxamides derived from the $\alpha,\beta$-unsaturated carboxylic acids for use in preparing the copolymers of the present invention may be defined as any $\alpha,\beta$-unsaturated carboxamide which, under inverse emulsion polymerization conditions, will coreact with a hydroxy-containing vinyl carboxylic ester with loss of its vinyl unsaturation to produce a water-soluble copolymer which is essentially free of cross-linking.

Examples of vinyl carboxamides include acrylamide, methacrylamide, crotonamide, isocrotonamide and the like, which may be substituted, for example, such as N-methyl methacrylamide and such as N-hydroxyethyl methacrylamide. In general, these vinyl carboxamides may be substituted with substituent groups that facilitate inverse emulsion polymerization with a hydroxy-containing vinyl carboxylic ester to produce a water-soluble copolymer which is essentially free of cross-linking.

Preferred vinyl carboxamides include acrylamide and methacrylamide.

The hydroxy-containing vinyl carboxylic esters derived from the $\alpha,\beta$-unsaturated carboxylic acids for use in preparing the copolymers of the present invention may be defined as any hydroxy-containing $\alpha,\beta$-unsaturated carboxylic ester which, under inverse emulsion polymerization conditions, will coreact with a vinyl carboxamide with loss of its vinyl unsaturation to produce a water-soluble copolymer which is essentially free of cross-linking. It has been found that it is necessary for the ester to include an organic radical having at least one hydroxy group to render the copolymer effective as a shale hydration inhibitor. These esters may be further substituted with substituent groups that facilitate inverse emulsion polymerization with a vinyl carboxamide to produce a water-soluble copolymer which is essentially free of cross-linking so long as such substituents do not interfere with the activity of the hydroxy radical in the final copolymer product.

Examples of hydroxy-containing vinyl carboxylic esters include 2-hydroxyethyl acrylate, 2-hydroxyethyl methacrylate, hydroxypropyl methacrylate, hydroxybutyl methacrylate, pentaethylene glycol monomethacrylate and decaethylene glycol monomethacrylate.

Preferred vinyl carboxylic esters include 2-hydroxyethyl methacrylate, pentaethylene glycol monomethacrylate and hydroxypropyl methacrylate.

Preferred copolymers are those represented by the general formula

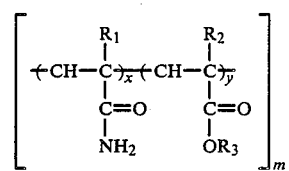

wherein
- $R_1$ and $R_2$ can be the same or different and represent hydrogen and alkyl radicals having from 1 to about 4 carbon atoms;
- $R_3$ represents hydroxyalkyl radicals having from about 2 to about 4 carbon atoms, polyhydroxyalkyl radicals having from about 3 to about 20 carbon atoms and from about 2 to about 3 hydroxy radicals, and hydroxypoly(alkoxy) radicals having from about 2 to about 20 carbon atoms and from 1 to about 3 hydroxy radicals;
- $x$ represents an integer from about 6 to about 28;
- $y$ represents an integer from 1 to about 5; and
- $m$ represents an integer from about 100 to about 10,000.

Where $R_3$ represents a hydroxyalkyl radical, the copolymer will have the general formula

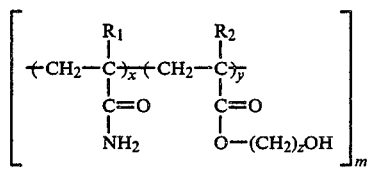

wherein
- $z$ represents an integer from 2 to about 4 and
- $R_1$, $R_2$, $x$, $y$ and $m$ represent the variables as described above.

Where $R_3$ represents a hydroxypoly(alkoxy) radical, the copolymer will have the general formula

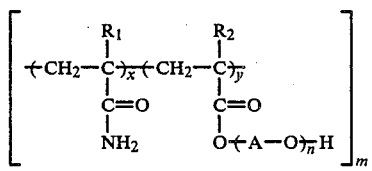

wherein
- $n$ represents an integer from 1 to about 10;
- A represents an alkylene group having from about 2 to about 4 carbon atoms and hydroxy-substituted alkylene groups having from about 2 to about 4 carbon atoms and from 1 to about 3 hydroxy radicals; and
- $R_1$, $R_2$, $x$, $y$ and $m$ represent the variables as defined above.

Where $R_3$ represents a polyhydroxyalkyl radical, the copolymer will have the general formula

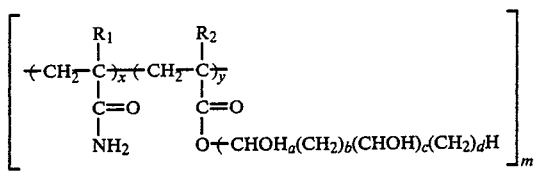

wherein
- b and d are the same or different and represent integers from 0 to about 10;
- a and c are the same or different and represent integers from 0 to about 3 wherein a+c is less than about 3; and
- $R_1$, $R_2$, x, y and m represent the variables as defined above.

Preferred hydroxyalkyl ester monomers of acrylic and methacrylic acid include commercially available 2-hydroxethyl methacrylate, 2-hydroxyethyl acrylate and hydroxypropyl acrylate which are available from Rohm Tech, and hydroxybutyl acrylate which is available from Aldrich Chemical Company, Inc.

The following non-limiting examples are for illustrative purposes only and represent the best mode for preparing copolymers of the present invention utilizing a hydroxyalkyl acrylate or methacrylate.

EXAMPLE 1

A solution of Rapisol B-246 (an emulsifier derived from a condensation polymer of polyethyleneglycol, 12-hydroxystearic acid and stearic acid) in 8 g of xylene was added to a stirred solution of 40.5 g of Glycomul 0 (sorbitan oleate) and 15 g of Acryloid 917 (terpolymer of vinyl pyrrolidone, butylmethacrylate and stearylmethacrylate) in 300 g of Isopar M (isoparaffinic solvent from Exxon). Vazo 52 (0.31 g) (2,2'- azobis(2,4-dimethylvaleronitrile)) was dissolved in 6 g of xylene and added to the mixture and the mixture was stirred under vacuum. An aqueous solution of 37.5 g of hydroxyethylmethacrylate, 675 g of 50% aqueous acrylamide, 352.5 g of deionized water, 7 g of sodium sulfate and 1.5 g of Versenex 80 (tetrasodium salt of ethylenediamine tetraacetate) was adjusted to pH 5.5 and added to the stirred organ portion. An emulsion was formed under vacuum at room temperature. The reactor was pressurized with nitrogen, followed by evacuation and finally pressurized with nitrogen to 10 psi. The temperature was increased to 40° C. and maintained at 40°-42° C. for 3-4 hours. The temperature was then increased to 55° C. and maintained at 55°-57° C. for 2-3 hours. It was then cooled to 30° C., the nitrogen released, and 23 g of 50% sodium hydroxide was added slowly to the stirred mixture. Stirring continued for at least 15 minutes. Forty-five grams of an ethoxylated nonylphenol were then added slowly with stirring. The product, which is 25% active, has a Brookfield viscosity of 30 cps or higher for a 1% emulsion product in 10% sodium chloride solution.

Table A represents non-limiting examples of copolymers produced by varying the weight percentages of the monomers and utilizing the procedure set forth in Example 1.

TABLE A

| Example | HEMA (Wt. % based on total Wt. of monomers) | Acrylamide (Wt. % based on total Wt. of monomers) |
|---------|---------------------------------------------|---------------------------------------------------|
| 2       | 15                                          | 85                                                |
| 3       | 5                                           | 95                                                |

It is contemplated that other hydroxyalkyl acrylates and methacrylates can be substituted for those utilized in these examples to obtain other shale stabilizing copolymers. For example, it is contemplated that hydroxypropyl and hydroxybutyl acrylates and methacrylates may be utilized and that such hydroxyalkyl acrylates and methacrylates may be substituted as hereinbefore described. Furthermore, it is contemplated that other hydroxy-containing vinyl carboxylic esters as hereinbefore described and that other vinyl carboxamides as hereinbefore described can be substituted for those utilized in these examples.

The weight percent of acrylamide and hydroxyalkyl acrylate or methacrylate can be varied to achieve different copolymers. For effective shale stabilizers utilizing hydroxyalkyl or hydroxypropyl methacrylate, the weight percent of acrylamide or methacrylamide should be from about 85 to about 95 percent based on the total weight of the monomers.

Suitable hydroxypoly(alkoxyl) acrylates and methacrylates include commercially available polyethylene glycol monomethacrylates of the general formula $CH_2=C(CH_3)C(O)O((CH_2)_zO)_aH$ wherein "a" represents an integer from 1 to about 10 and "z" represents an integer from 1 to about 4. Polyethylene glycol monomethacrylates wherein "z" represents the integer 2 and "a" represents the integer 5 or the integer 10 are available from Alcolac.

The following non-limiting examples are for illustrative purposes only and represent the best mode for preparing copolymers of the present invention utilizing a hydroxypoly(alkoxy) acrylate.

EXAMPLE 4

A solution of 45 g of Glycomul O (sorbitan oleate) and 15 g of Acryloid 917 (terpolymer of vinyl pyrrolidone, butylmethacrylate, stearylmethacrylate) in 308 g of Isopar M (isoparaffinic solvent from Exxon) was stirred in a one gallon reactor. Vazo 52 (0.31g) (2,2'-azobis(2,4-dimethylvaleronitrile)) dissolved in 6 g of xylene was added to the mixture and the mixture was stirred under vacuum. An aqueous solution of 45 g of pentaethyleneglycol monomethacrylate, $(CH_2=C(CH_3)COO(CH_2CH_2O)_5H)$, 810 g of 50% aqueous acrylamide, 210 g of deionized water, 0.6 g of ethylenediamine tetraacetate sodium salt and 7 g of sodium sulfate was adjusted to pH 5.5 and added to the stirred organic portion. An emulsion was formed under vacuum at room temperature. The reactor was pressurized with nitrogen, followed by evacuation and finally pressurized with nitrogen at 10 psi. The temperature was increased to 40° C. and maintained at 40°-42° C. for 3-4 hours. The temperature was then increased to 55° C. and maintained at 55°-57° C. for 2-3 hours. It was then cooled to 30° C., the nitrogen released, and 18.9 g of 50% sodium hydroxide was added slowly to the stirred mixture. Stirring was continued for at least 15 minutes. Forty-five grams of an ethoxylated nonylphenol were then added slowly with stirring. The product which is 30% active has a Brookfield viscosity of 20 cps or higher for a 1% emulsion product in 10% sodium chloride solution.

EXAMPLE 5

A solution of 45 g of Glycomul O (sorbitan oleate) and 15 g of Acryloid 917 (terpolymer of vinyl pyrrolidone, butylmethacrylate, stearylmethacrylate) in 308 g of Isopar M (isoparaffinic solvent from Exxon) was stirred in a one gallon reactor. Vazo 52 (0.31g) 2,2'-azobis(2,4-dimethylvaleronitrile) dissolved in 6 g of xylene was added to the mixture and the mixture was stirred under vacuum. An aqueous solution of 45 g of decaethyleneglycol monomethacrylate, 810 g of 50% aqueous acrylamide, 210 g of deionized water, 0.6 g of ethylenediamine tetraacetic acid sodium salt and 7 g of sodium sulfate was adjusted to pH 5.5 and added to the stirred organic portion. An emulsion was formed under vacuum at room temperature. The reactor was pressurized with nitrogen, followed by evacuation and finally pressurized with nitrogen to 10 psi. The temperature was increased to 40° C. and maintained at 55°–57° C. for 2–3 hours. It was then cooled to 30° C., nitrogen released, and 6.9 g of 50% sodium hydroxide was added slowly to the stirred mixture and stirring continued for at least 15 minutes. Forty-five grams of an ethoxylated nonylphenol were then added slowly with stirring. The product which is 30% active has a Brookfield viscosity of 20 cps or higher for a 1% emulsion product in 10% sodium chloride solution.

EXAMPLE 6

Utilizing the procedure of Example 4, the weight percent, based on total weight of the monomers, of the acrylamide was decreased from 95% to 90% and that of the pentaethyleneglycol monomethacrylate was increased to 10%.

It is contemplated that other hydroxypoly(alkoxy) acrylates and methacrylates and poly(alkoxy) esters of other vinyl carboxylic acids as hereinbefore described, as well as the other vinyl carboxamides as hereinbefore described, can be substituted for those utilized in these examples and that the copolymers produced will be useful as shale stabilizers.

Suitable polyhydroxyalkyl esters of acrylic and methacrylic acids include 2,3-dihydroxypropyl methacrylate and 3,4-dihydroxybutyl methacrylate, preparations for which are well known in the art.

The following non-limiting example is for illustrative purposes only and represents the best mode for preparing copolymers of the present invention utilizing a polyhydroxyalkyl ester of acrylic acid.

EXAMPLE 7

Following the procedure set forth in Example 1, a copolymer was prepared utilizing 95% acrylamide based on total weight of the monomers and 5% 2,3-dihydroxypropyl acrylate.

It is contemplated that other dihydroxy and polyhydroxy acrylates and methacrylates as well as polyhydroxy alkyl esters of other vinyl carboxylic acids as hereinbefore described can be substituted for the dihydroxypropyl acrylate of Example 7 to achieve useful copolymers. Furthermore, it is contemplated that other vinyl carboxamides as hereinbefore described can also be utilized.

The copolymers of the present invention are prepared by known inverse emulsion polymerization techniques. The molar ratio of the vinyl carboxamide monomer to hydroxy radical of the hydroxy-containing vinyl carboxylic ester is preferably from about 6.65 to about 28. Below about 6.5 there is greater probability that cross-linking will occur and therefore more of a tendency for the copolymer to gel. For example, a copolymer of hydroxypropyl acrylate and acrylamide (20 and 80 weight percent respectively based on total weight of the monomers) produces a gel. The molar ratio of acrylamide to hydroxy radical is 6.25. Similarly, copolymers of (1) dihydroxyethyl acrylate and acrylamide (15 and 85 weight percent respectively) and (2) hydroxyethylmethacrylate and acrylamide (20 and 80 percent respectively) produced gels where the molar ratio of acrylamide to hydroxy radical is 4.21 and 5.6 respectively. Gels are not suitable for use as drilling fluid additives and therefore are not preferred. Therefore, the molar amount of the vinyl carboxamide monomer must be sufficient to prevent gelation of the copolymer. This is generally above a molar ratio of about 6.5 (moles of vinyl carboxamide to moles of hydroxy radical), preferably above about 6.65. When the molar ratio is above about 30, the activity of the copolymer as a shale stabilizer is reduced below a commercially practical level. Thus, the molar amount of hydroxy radical must be sufficient to render the copolymer effective as a shale stabilizer. This is generally below a molar ratio of about 30 (moles of vinyl carboxamide to moles of hydroxy radical), preferably below about 28.

The copolymers produced according to the teachings of the present invention are random copolymers which are water-soluble and essentially free of cross-linking. Although a minor amount of cross-linking may occur, particularly where the molar ratio of vinyl carboxamide to hydroxy radical approaches 6.5, the addition of an effective amount of an anti-cross-linking agent, for example, sodium hydroxide, can be utilized to render the copolymers essentially free of cross-linking. Where the use of such agent is required, it is advantageous to utilize a molar amount thereof equal to the molar amount of the hydroxy-containing vinyl carboxylic ester monomer. Below a molar ratio of about 6.5 the copolymers tend to gel as hereinbefore described, and generally cannot be rendered essentially free of cross-linking. Therefore, those copolymers tending to become irreversibly cross-linked are not preferred.

The copolymers of the present invention are useful as shale stabilizers in that when one or more of the copolymers is added to a drilling fluid and the drilling fluid is circulated through the well bore, hydration of shale is inhibited to thereby prevent shale sloughing.

Table B illustrates the effectiveness of the copolymers of this invention upon evaluation utilizing shale material from various locations. The testing procedure utilized simulates exposure of shale to drilling fluids containing the additives and indicates the shale hydration inhibiting and shale stabilizing properties of the copolymers. This testing procedure (roll test) comprises breaking the shale material into fragments which will pass through −4 to +10 mesh screen, adding 25 grams of fragmented shale material to 350 ml of drilling fluid in a one-pint jar, rolling the samples for approximately 16 hours in a roller oven at 65° C., filtering through a 30 mesh size screen, washing the shale material to remove fines, drying at 120° C. for 2 hours and weighing the dried material to determine percent recovery which will indicate percent erosion. This test is a modified version of a test developed at Amoco Production Company by Anderson and Edwards and presented at the 1977 Drilling Technology Conference of the International Association of Drilling Contractors March 16–18.

TABLE B

| Copolymer | lbs/bbl | Shale | System | % Recovery |
|---|---|---|---|---|
| Blank | — | A | Fresh Water | 3 |
| Ex. 1 | .5 | A | " | 74 |
| Ex. 2 | .5 | A | " | 50 |
| Ex. 3 | .5 | A | " | 15 |
| Ex. 6 | .5 | A | " | 57 |
| Blank | — | A | 3% KCl | 20 |
| Ex. 1 | .5 | A | " | 88 |
| Ex. 2 | .5 | A | " | 72 |
| Ex. 3 | .5 | A | " | 90 |
| Ex. 6 | .5 | A | " | 67 |

Table C illustrates the superior performance of the present copolymers as compared to commercial chemical X which is currently marketed as a shale stabilizer. The test utilized is the modified Amoco roll test described above.

TABLE C

| | | % Erosion | |
|---|---|---|---|
| Additive | Shale | Fresh Water | 3% KCl |
| Blank | A (high clay content - 20–25% shale) | 95.3 | 90.0 |
| Example 1 | A | 28.7 | 29.3 |
| X | A | 64.1 | 63.7 |
| Blank | B (medium clay content - 5–15% shale) | 74.1 | 36.9 |
| Example 1 | B | 35.2 | 25.4 |
| X | B | 55.2 | 21.4 |
| Blank | C (low clay content - 1% shale) | 28.5 | 14.6 |
| Example 1 | C | 16.2 | 11.2 |
| X | C | 20.7 | 9.4 |

Table D illustrates the superior performance of the present copolymers as compared to commercial chemicals Y, Z and S which are marketed as shale stabilizers. The test utilized was the modified Amoco roll test as described above.

TABLE D

| | | | % Recovery | |
|---|---|---|---|---|
| Additive | lbs/bbl | Shale | Fresh Water | 3% KCl |
| Blank | — | A | 4.7 | 10 |
| Example 1 | .5 | A | 66.7 | 62 |
| Y | .5 | A | 6 | 57.2 |
| Z | .5 | A | 3.6 | 22 |
| S | .5 | A | 5.95 | 44.4 |
| Blank | — | B | 25.9 | 63.1 |
| Example 1 | .5 | B | 76 | 93.9 |
| Y | .5 | B | 40 | 91.9 |
| Z | .5 | B | 35.7 | 66.9 |
| S | .5 | B | 52.4 | 72.9 |
| Blank | — | C | 71.5 | 85.4 |
| Example 1 | .5 | C | 80 | 95.2 |
| Y | .5 | C | 78.6 | 90.8 |
| Z | .5 | C | 72 | 86.8 |
| S | .5 | C | 81 | 92.4 |

Table E illustrates the shale stabilizing effectiveness of the present copolymers as compared to an alkoxyalkyl ester of acrylic acid copolymerized under the conditions described herein with acrylamide which shows no activity.

TABLE E

| Vinyl Carboxylic Ester (10% based on wt. of monomers) | VinylCarboxamide (90% based on wt. of monomers) | lb/bbl | Shale | System | % Recovery |
|---|---|---|---|---|---|
| Blank | — | — | B | Fresh Water | 56.6 |
| 2-hydroxypropylacrylate | acrylamide | .5 | B | " | 94.9 |
| 2,3-dihydroxypropylacrylate | " | .5 | B | " | 95.6 |
| 2-hydroxyethylmethacrylate | " | .5 | B | " | 93.9 |
| Ethoxyethylacrylate | " | .5 | B | " | 60.8 |

The copolymer may be added to any aqueous base drilling fluid at the drilling or rig location in an amount from between about 0.25 p.p.b. to about 5 p.p.b. (pounds per 42 gallon barrel). The amount needed will vary, of course, depending upon the particular type of aqueous drilling fluid utilized, such as brine, sea water, or the like, the weight of the given drilling fluid, and the presence and amount of other chemical additives, such as corrosion inhibitors, fluid loss additives and the like. Simple and commercially available testing techniques may be easily utilized at the well site to determine the amount of copolymer which must be added to the circulatable drilling fluid to provide effective shale stabilization in the subterranean well. Because of the loss of material in the well, such as through adsorption onto the surface of the drilled solids and the like, it may be necessary to incrementally add portions of the copolymer to the drilling fluid from time to time to maintain the required concentration.

The copolymers of the present invention can be characterized as water-soluble inverse emulsion random copolymers which are essentially free of cross-linking. It is contemplated that such copolymers have a molecular weight from about 800,000 to about 5 million. These copolymers are particularly adapted to inhibit hydration of shale and therefore are useful as shale stabilizing additives in drilling fluids for use in oil well drilling operations wherein heaving or sloughing shales are expected to be encountered.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present inven-

What is claimed is:

1. Method of stabilizing a shale formation which comprises contacting at least a portion of said formation with an amount, effective to inhibit shale hydration, of a composition containing a water-soluble inverse emulsion copolymer consisting essentially of an amide of a vinyl carboxylic acid and a hydroxy-containing ester of a vinyl carboxylic acid.

2. Method of stabilizing a shale formation encountered during an oil well drilling operation which comprises circulating through said formation a drilling fluid containing a water-soluble inverse emulsion copolymer consisting essentially of an amide of a vinyl carboxylic acid and a hydroxy-containing ester of a vinyl carboxylic acid.

* * * * *